Patented June 6, 1944

2,350,361

UNITED STATES PATENT OFFICE 2,350,361

HYDROGENATION OF DIETHYL-STILBOESTROL

Randolph T. Major, Plainfield, Clarence C. Christman, Colonia, and Karl Folkers, Plainfield, N. J., assignors to Merck & Co., Inc., Rahway, N. J., a corporation of New Jersey No Drawing. Application July 12, 1940, Serial No. 345,204

5 Claims. (Cl. 260—631)

This invention relates to hydrogenation products of diethylstilboestrol, which is a synthetic estrogenic substance of the formula

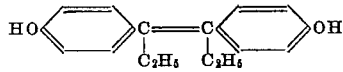

We have now produced a hydrogenated derivative of diethylstilboestrol by hydrogenation over a catalyst for the hydrogenation of aromatic nuclei and an ethylenic double bond such as Raney nickel, a supported nickel catalyst such as nickel on kieselguhr, and platinum. It is perhydro-diethylstilboestrol, is useful as an intermediate in the synthesis of substances which exhibit the activity of sex hormones, and has the formula

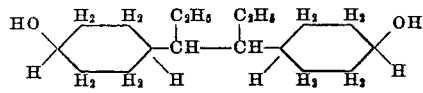

A study of the structural formula reveals that hydrogenation of diethylstilboestrol introduces centers of asymmetry into the molecule and that a number of isomers are possible. Obviously the reaction product will consist of a mixture of isomers.

The following example describing specific embodiments of our invention is given by way of illustration only, and obviously may be modified considerably as the catalyst employed, operating conditions and quantitative relationships, without departing from the spirit and scope of the invention.

Example

About 24 gms. of diethylstilboestrol dissolved in about 150 mls. of absolute ethanol are hydrogenated over 5 gms. of Raney nickel at about 160° C. and 4500 pounds pressure for 24 hours. The filtrate is concentrated to a crystalline mass. The crystalline product is recrystallized from ethyl acetate. Crystals having a melting point of about 185° C. are obtained. The mother liquors are concentrated to remove ethyl acetate and the residue rehydrogenated using 5 grams of fresh catalyst and ethyl alcohol. The rehydrogenated product also melts at about 185° C.; the mother liquors from this crop are rehydrogenated and yield crystals which melt at about 185° C.

After recrystallizations from methanol the melting point of the collected crude product is raised to about 190.5° C.

We claim:
1. The product of the formula

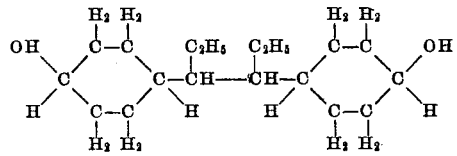

2. The process comprising hydrogenating diethylstilboestrol over a catalyst for the hydrogenation of aromatic nuclei, and an ethylenic double bond, and selected from the group consisting of nickel and platinum.

3. The process comprising hydrogenating diethylstilboestrol over a Raney nickel catalyst.

4. The process comprising hydrogenating diethylstilboestrol over a supported nickel catalyst.

5. The process comprising hydrogenating diethylstilboestrol over platinum.

RANDOLPH T. MAJOR.
CLARENCE C. CHRISTMAN.
KARL FOLKERS.